(12) United States Patent
Mori et al.

(10) Patent No.: US 8,789,080 B2
(45) Date of Patent: Jul. 22, 2014

(54) VIEWING BEHAVIOR LEARNING APPARATUS

(75) Inventors: Kouichirou Mori, Saitama (JP);
Tomoko Murakami, Yokohama (JP);
Ryohei Orihara, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 825 days.

(21) Appl. No.: 12/235,630

(22) Filed: Sep. 23, 2008

(65) Prior Publication Data
US 2009/0106786 A1    Apr. 23, 2009

(30) Foreign Application Priority Data
Oct. 19, 2007  (JP) .............................. P2007-272236

(51) Int. Cl.
*H04H 60/33*  (2008.01)
(52) U.S. Cl.
USPC ...................... 725/9; 725/10; 725/13; 725/14
(58) Field of Classification Search
USPC ....................................................... 725/9–21
See application file for complete search history.

(56) References Cited

U.S. PATENT DOCUMENTS

2007/0276859 A1* 11/2007 Aravamudan et al. ........ 707/102
2008/0222680 A1* 9/2008 Murakami ...................... 725/46

FOREIGN PATENT DOCUMENTS

JP    2006-229707      8/2006
JP    2005-244504    * 3/2007

* cited by examiner

*Primary Examiner* — Kunal Langhnoja
(74) *Attorney, Agent, or Firm* — Amin, Turocy & Watson, LLP

(57) ABSTRACT

A viewing behavior learning apparatus includes: a viewing history acquiring unit that acquires a viewing record that indicates an attribute of a program and start and end times during which a viewer viewed the program; a viewing history dividing unit that divides the viewing record every discretized time points that is discretized by a unit time; a viewing history replicating unit that discretizes a viewing time period denoted by the divided viewing records by interval shorter than the unit time to obtain discretized viewing time periods; a viewing behavior storage unit that builds a model of the viewing behavior by use of a Bayesian network having the viewing time period and the attribute as random variables and stores a conditional probability table of the Bayesian network; and a viewing behavior updating unit that updates the conditional probability table using the discretized viewing time periods.

12 Claims, 8 Drawing Sheets

FIG.2

EXAMPLE OF VIEWING HISTORY DATA

| DATE | DAY | IN TIME | OUT TIME | CHANNEL | GENRE | TITLE |
|---|---|---|---|---|---|---|
| 2007/7/31 | TUESDAY | 19:08:54 | 19:10:51 | CH1 | DOCUMENTARY | TITLE A |
| 2007/7/31 | TUESDAY | 19:10:51 | 19:11:01 | CH2 | DRAMA | TITLE B |
| 2007/7/31 | TUESDAY | 19:11:01 | 19:12:08 | CH3 | HOBBY | TITLE C |
| 2007/7/31 | TUESDAY | 19:12:08 | 19:13:16 | CH4 | NEWS | TITLE D |
| 2007/7/31 | TUESDAY | 19:13:16 | 21:01:50 | CH1 | DOCUMENTARY | TITLE A |
| 2007/7/31 | TUESDAY | 21:01:50 | 23:13:10 | CH5 | MOVIES | TITLE E |

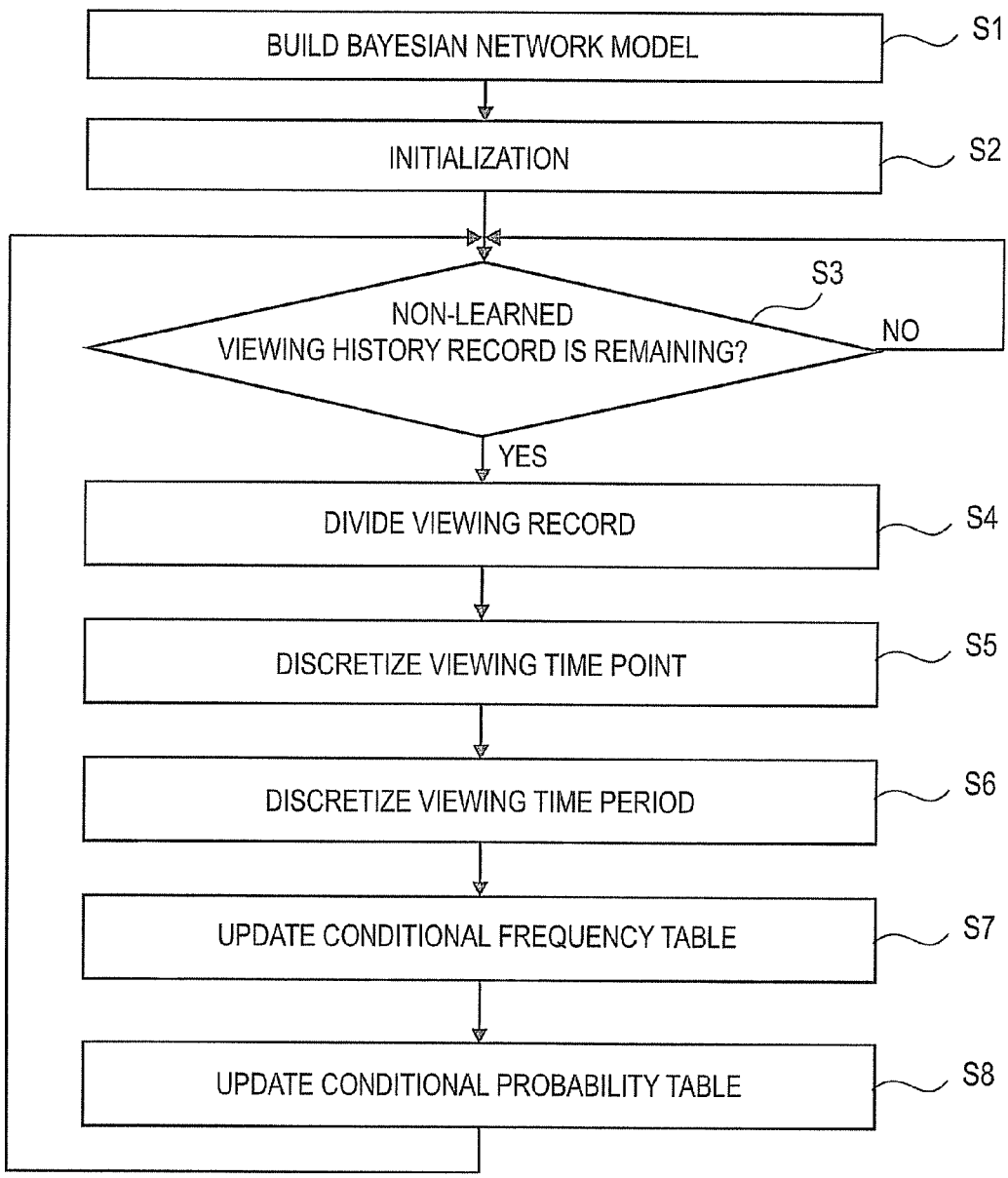

FIG.6

EXAMPLE OF DIVIDED VIEWING RECORDS

| DATE | DAY | IN TIME | OUT TIME | CHANNEL | GENRE | DISCRETIZED TIME POINT |
|---|---|---|---|---|---|---|
| 2007/8/5 | SUNDAY | 20:58 | 21:00 | CH1 | NEWS | 20-21 |
| 2007/8/5 | SUNDAY | 21:00 | 22:00 | CH1 | NEWS | 21-22 |
| 2007/8/5 | SUNDAY | 22:00 | 22:10 | CH1 | NEWS | 22-23 |

FIG.7

EXAMPLE OF VIEWING HISTORY DATA DIVIDED EVERY DISCRETIZED TIME POINTS

| DATE | DAY | IN TIME | OUT TIME | CHANNEL | GENRE | DISCRETIZED TIME POINT | NUMBER OF REPLICATIONS |
|---|---|---|---|---|---|---|---|
| 2007/8/5 | SUNDAY | 21:00 | 21:15 | CH1 | DRAMA | 21-22 | ×15 |
| 2007/8/12 | SUNDAY | 21:00 | 22:00 | CH2 | MOVIES | 21-22 | ×60 |
| 2007/8/19 | SUNDAY | 21:00 | 21:05 | CH1 | DRAMA | 21-22 | ×5 |
| 2007/8/19 | SUNDAY | 21:05 | 21:06 | CH3 | NEWS | 21-22 | ×1 |
| 2007/8/19 | SUNDAY | 21:06 | 21:08 | CH1 | DRAMA | 21-22 | ×2 |
| 2007/8/19 | SUNDAY | 21:08 | 21:10 | CH3 | NEWS | 21-22 | ×2 |
| 2007/8/19 | SUNDAY | 21:10 | 21:14 | CH1 | DRAMA | 21-22 | ×4 |
| 2007/8/19 | SUNDAY | 21:14 | 21:15 | CH3 | NEWS | 21-22 | ×1 |
| 2007/8/19 | SUNDAY | 21:15 | 22:00 | CH2 | MOVIES | 21-22 | ×45 |
| 2007/8/26 | SUNDAY | 21:55 | 22:00 | CH1 | HOBBY | 21-22 | ×5 |

FIG.8

EXAMPLE OF CONDITIONAL FREQUENCY TABLE OF NODE OF CHANNEL

| CHILD NODE: CHANNEL | | FREQUENCY | | |
|---|---|---|---|---|
| PARENT NODE: DAY | PARENT NODE: TIME | CH1 | CH2 | CH3 |
| | | ... | | |
| SUNDAY | 20-21 | | | |
| SUNDAY | 21-22 | 31 | 105 | 4 |
| SUNDAY | 22-23 | | | |
| | | ... | | |
| SATURDAY | 23-24 | | | |

FIG.9

EXAMPLE OF CONDITIONAL FREQUENCY TABLE OF NODE OF GENRE

| CHILD NODE: CHANNEL | | FREQUENCY | | | |
|---|---|---|---|---|---|
| PARENT NODE: DAY | PARENT NODE : TIME POINT | DRAMA | MOVIES | NEWS | HOBBY |
| | | ... | | | |
| SUNDAY | 20-21 | | | | |
| SUNDAY | 21-22 | 26 | 105 | 4 | 5 |
| SUNDAY | 22-23 | | | | |
| | | ... | | | |
| SATURDAY | 23-24 | | | | |

FIG.10

EXAMPLE OF CONDITIONAL PROBABILITY TABLE OF NODE OF CHANNEL

| CHILD NODE: CHANNEL | | PROBABILITY | | |
|---|---|---|---|---|
| PARENT NODE: DAY | PARENT NODE : TIME POINT | CH1 | CH2 | CH3 |
| | | ... | | |
| SUNDAY | 20-21 | | | |
| SUNDAY | 21-22 | 22% | 75% | 3% |
| SUNDAY | 22-23 | | | |
| | | ... | | |
| SATURDAY | 23-24 | | | |

FIG.11

EXAMPLE OF CONDITIOANL PROBABILITY TABLE OF NODE OF GENRE

| CHILD NODE: CHANNEL | | PROBABILITY | | | |
|---|---|---|---|---|---|
| PARENT NODE: DAY | PARENT NODE : TIME POINT | DRAMA | MOVIES | NEWS | HOBBY |
| | | ... | | | |
| SUNDAY | 20-21 | | | | |
| SUNDAY | 21-22 | 19% | 75% | 3% | 3% |
| SUNDAY | 22-23 | | | | |
| | | ... | | | |
| SATURDAY | 23-24 | | | | |

VIEWING BEHAVIOR LEARNING APPARATUS

RELATED APPLICATION(S)

The present disclosure relates to the subject matters contained in Japanese Patent Application No. 2007-272236 filed on Oct. 19, 2007, which are incorporated herein by reference in its entirety.

FIELD

The present invention relates to a viewing behavior learning apparatus for learning a viewer's behavior of viewing information such as a television broadcast.

BACKGROUND

In recent years, channels and contents viewable by a television set are increased, such as terrestrial digital broadcast, BS digital broadcast, CS digital broadcast, pay-per-view (PPV) broadcast, video on demand (VOD), and contents on the Internet. Accordingly, operations required for a user to search for a desired program and to select a desired channel have become troublesome.

A storage capacity provided in a video recorder has been enlarged, and the video recorder has become capable of recording a massive amount of the programs. In order to find a program to be viewed from the massive programs recorded in the video recorder, the user (viewer) is required to use the functions, such as paging, sorting, and searching, which is a time-consuming and troublesome operation for the viewer.

As described above, the user interface of the video recorder has become more complicated as the number of channels and functions for the video recorder increases. Accordingly, there is an increasing need for a system learning a user's behavior and properly predicting the user's intention to appropriately operate.

There is known a system for digital television sets and video recorders, which learns a user's viewing behavior from a reproduction history of recorded contents and broadcast contents and recommends suitable contents to the user. For example, in JP-A-2006-229707, there is disclosed a system that accumulates a user's viewing behavior by storing days, times, genres of the reproduced recorded program and recommends to the user a program belonging to a genre that suits the day and time to be viewed.

A first problem that arises in the conventional system is that the learning of the user's viewing behavior requires a long period of time. In a system that learns a user's viewing behavior and recommending proper contents, the user may stop using such function if no remarkable merit is exerted as soon as the user starts using the system. Therefore, the learning of the user's viewing behavior is required to be made in a short period of time.

However, when the viewing behavior is learned by the combination of days and time zones, the learning requires quite a long period of time. For example, when a viewing behavior of a genre on a Sunday night is to be learned, the frequency of program genres viewed on Sunday nights is counted. Since the Sunday night comes four or five times a month, only several times of operation history could be acquired for a month by the use of such method. Accordingly, even when data is acquired for a month, the number of data for preparing a reliable viewing behavior model is not sufficient.

When a statistical learning method is used, the small number of frequency cannot guarantee the value in statistically correct probability. For example, when the night time zone is finely divided and discretized in the unit of, e.g., 1 hour to better understand the viewing behavior, the frequency is further dispersed. Accordingly, a longer-term learning is required to acquire reliable probability values.

A second problem that arises in the conventional system is a treatment of zapping operation, by which a program viewed by the viewer is frequently changed. The video recorder tends to be used in a manner where the zapping operation is less frequent for viewing the recorded programs, and thus information on the viewing time zone can be easily acquired. However, in a case where a television broadcast is directly viewed without being recorded, the viewer may tend to perform the zapping operation. When the user frequently switches the program to be viewed by the zapping operation, learning the user's viewing behavior becomes difficult. Accordingly, implementation of a method of applying a threshold value for the viewing time period is considered to exclude a channel operation determined as the zapping. For example, when the threshold value is set to be three minutes, a program to be viewed being changed in less than three minutes is considered to be zapped and is not considered as a viewed program.

However, when the threshold value is set for determining the zapping, all the programs viewed for the threshold value or less are excluded from the learning. That is, when the threshold value is set to, for example, three minutes and the user completes viewing a program having three minutes or less without the zapping operation, the system determines that the program was not viewed by the, whereby learning of a proper viewing behavior would not be performed.

A third problem that arises in the conventional system relates to the discretization of a viewing time period. In the statistical learning methods, attributes having a continuous value are often discretized. For example, since the attribute of time point has a continuous value, a method of dividing one day into 24 values in the unit of one hour such as 00:00 to 01:00 (0-1), 01:00 to 02:00 (1-2), and 02:00 to 03:00 (2-3) can be employed.

The viewing time point is used to learn the viewing behavior. For example, when a user views a movie from 21:00 to 22:00, the operation history data is assigned to 21-22 and the frequency is counted. However, when a user views a movie from 21:30 to 23:30, it is necessary to clarify how to discretize the viewing time point.

SUMMARY

According to an aspect of the present invention, there is provided a viewing behavior learning apparatus for learning a viewing behavior of a viewer who views a program including at least one of video and audio, the apparatus including: a viewing history acquiring unit that acquires a viewing record that indicates an attribute of the program and a viewing time point indicating a start time and an end time during which the viewer viewed the program; a viewing history dividing unit that divides the viewing record into divided viewing records every discretized time points that is discretized by a unit time; a viewing history replicating unit that discretizes a viewing time period denoted by the divided viewing records by interval shorter than the unit time to obtain discretized viewing time periods; a viewing behavior storage unit that builds a model of the viewing behavior by use of a Bayesian network having the viewing time point and the attribute of the program as random variables and stores a conditional probability table of the Bayesian network; and a viewing behavior updating unit that updates the conditional probability table using the discretized viewing time periods of the divided viewing records as a viewing frequency.

BRIEF DESCRIPTION OF THE DRAWINGS

In the accompanying drawings:

FIG. 2 is a table illustrating an example of viewing history data according to the embodiment;

FIG. 4 is a flowchart illustrating a viewing behavior learning method according to the embodiment;

FIG. 5 shows an example of a viewing record over a plurality of discretized time points;

FIG. 6 shows an example of viewing records obtained by dividing the viewing record shown in FIG. 5 according to the embodiment;

FIG. 7 shows an example of divided viewing history data obtained by dividing the viewing records every discretized time points according to the embodiment;

FIG. 8 shows an example of a conditional frequency table of node of channel according to the embodiment;

FIG. 9 shows an example of a conditional frequency table of node of genre according to the embodiment;

FIG. 10 shows an example of a conditional probability table of node of channel according to the embodiment; and FIG. 11 shows an example of a conditional probability table of node of genre according to the embodiment.

DETAILED DESCRIPTION OF THE EMBODIMENTS

Figure 1:
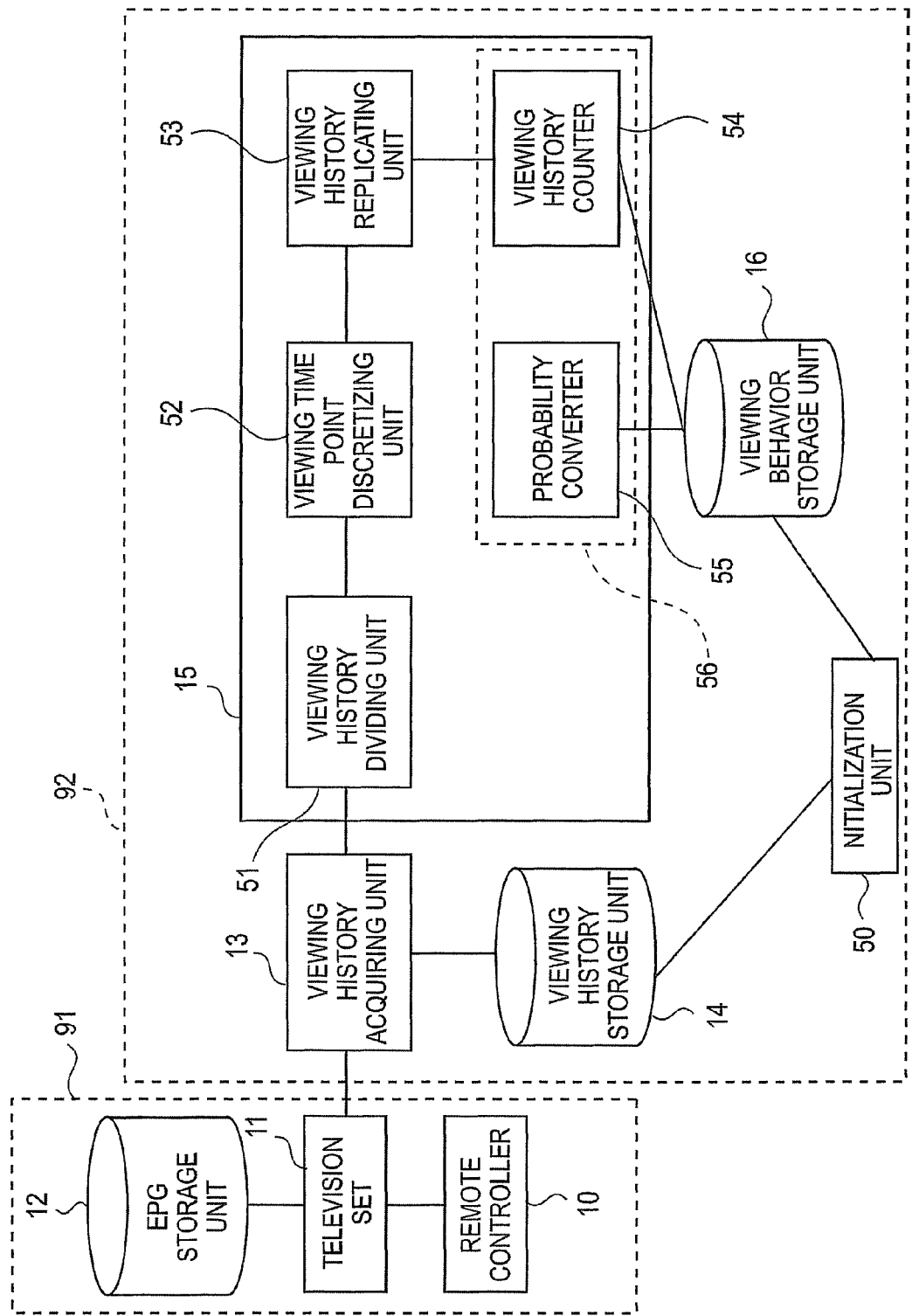
FIG. 1 is a block diagram illustrating a viewing behavior learning apparatus according to an embodiment of the invention.

A viewing behavior learning apparatus according to an embodiment of the invention will be described with reference to the accompanying drawings. The same or similar components are referenced by the same reference numerals and repeated description thereof is omitted.

FIG. 1 is block diagram illustrating a viewing behavior learning apparatus 92 according to an embodiment of the invention.

The viewing behavior learning apparatus 92 is an apparatus that learns a tendency of a viewer (user) viewing a program including at least one of video and audio with a viewing apparatus 91. The viewing apparatus 91 includes, for example, a television set 11 operated with a remote controller 10. The operation such as switching channels to be viewed by the viewing apparatus 91 may be performed using a channel changing button attached to the television set 11 as well as the remote controller 10.

In the description herein, the term "program" is used for information including at least one of video and audio, such as a program provided by a video on demand system, contents on the Internet, and a so-called television program broadcast by radio waves. As long as it outputs (displays) the program, the viewing apparatus 91 may include a video recorder or a set-top box of a cable television system, in addition to the television set 11.

For example, an EPG storage 12 is connected to the television set 11. The EPG storage 12 is a database for storing electronic program guide (EPG). The EPG includes, broadcasting date of a program, broadcasting station, start time, airtime (broadcasting hours), genre, title, list of performers, and details of the program. In the following description, particularly, broadcasting stations (channels) and genre information are noted.

The viewing behavior learning apparatus 92 includes a viewing history acquiring unit 13, a viewing behavior storage unit 16, and a viewing behavior learning unit 15.

The viewing history acquiring unit 13 is connected to, for example, the television set 11 and serves to acquire viewing records indicating attributes of programs viewed by a viewer, that is, programs output from the viewing apparatus 91, and viewing start times and viewing end times. The attributes of programs are information indicating features of the programs and includes, for example, channels or genres. The genres of the programs are acquired, for example, from the EPG storage unit 12.

FIG. 2 is a table illustrating an example of viewing history data according to the embodiment.

The viewing history data is a set of viewing records, for example, including viewing dates, days, viewing start times (In time), viewing end times (Out time), channels, genres, and titles. The In time indicates a time point when a channel is switched in to the channel corresponding to the data and the Out time indicates a time point when the channel corresponding to the data is switched out. For example, the viewing record in the first row shown in FIG. 2 indicates that the channel is switched to CH1 at 19:8:54 on Tuesday, Jul. 31, 2007 to start viewing a documentary of title A and then the channel is switched at 19:10:51 to CH2 in the second row.

The viewing history acquiring unit 13 captures, for example, a channel turning signal input from the remote controller 10 and acquires the viewing history data. The viewing history data acquired by the viewing history acquiring unit 13 may be stored in the viewing history storage unit 14.

The viewing behavior storage unit 16 models the viewing behavior by the use of the Bayesian network having the attribute of the viewing time point and the attribute of the program as random variables and stores a conditional probability table of the Bayesian network. The viewing behavior storage unit 16 stores a conditional frequency table corresponding to the conditional probability table.

Figure 3:
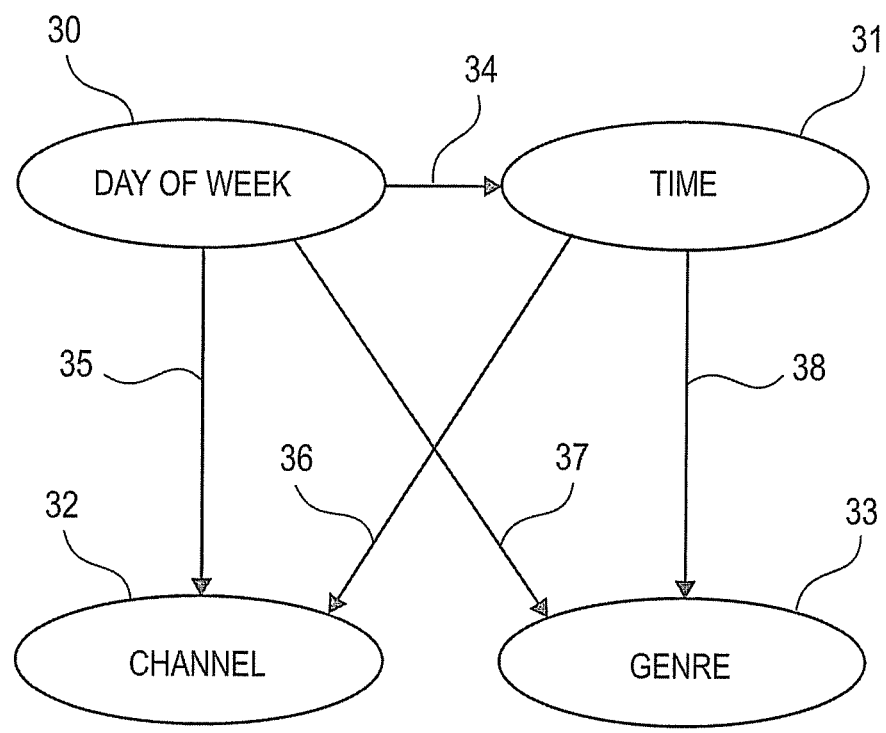
FIG. 3 is a graph structure illustrating a Bayesian network model obtained by modeling a viewer's viewing behavior according to the embodiment.

FIG. 3 shows a graph structure indicating the Bayesian network obtained by modeling the viewer's viewing behavior in the embodiment.

The Bayesian network is a probability model in which quantitative relations between plural random variables are represented by a graph structure and qualitative relations between the variables are represented by the conditional probability table. The Bayesian network includes nodes indicating the random variables and edges indicating causal relationships between the random variables. In FIG. 3, a node of day 30, a node of time point 31, a node of channel 32, and a node of genre 33 are random variables and arrows 34 to 38 connecting the nodes to each other are edges.

Each node has a discrete value. For example, the node of day (day of week) 30 represents a day when a program is viewed and has a value of one of Sunday, Monday, Tuesday, Wednesday, Thursday, Friday, and Saturday. The node of time point 31 represents a discretized time point for viewing. The time point is originally a continuous value, but is discretized into the discretized time points. In the embodiment, the time point is discretized, for example, by a unit time of one hour. The discretized viewing time point falls into one of 0-1, 1-2, 2-3, . . . , and 23-24. Here, 0-1 represents a time period from 0 o'clock to 1 o'clock.

The node of channel 32 indicates a viewed channel. Since the viewable channels are different depending on the types of the television set 11, the value of the node of channel 32 can vary and is simply marked by CH1, CH2, and the like herein. The node of genre 33 indicates a genre of a viewed program and has one value of news, sports, drama, music, variety shows, movies, animation, documentary, hobby, information, theater, welfare, and others. This discretization is only an example and is not limited.

The edges indicate causal relationship between the nodes. The edge 34 directed from the node of day 30 to the node of time point 31 represents that the viewing time point varies depending on the days. For example, it is possible to learn a habitude that a viewer frequently views a television on weekdays after he returns home but the viewer frequently views late-night program on Saturday.

The edges 35 and 36 directed from the node of day 30 and the node of time point 31 to the node of channel 32 represent that the viewing channel varies depending on combinations of days and time points. For example, it is possible to learn a habitude on viewing channel that the viewer frequently views CH1 from 6 o'clock to 8 o'clock on weekdays. The edges 37 and 38 directed from the node of day 30 and the node of time point 31 to the node of genre 33 represent that the viewing genre varies depending on combinations of days and time points. For example, it is possible to learn a habitude on viewing genre that the viewer frequently views movies from 21 o'clock on Sunday.

In the description herein, it is called the learning of viewing behavior to acquire the conditional probability table of the nodes from the acquired viewing history data.

The viewing behavior learning unit 15 includes a viewing history dividing unit 51, a viewing time point discretizing unit 52, a viewing history replicating unit 53, and a viewing behavior updating unit 56. The viewing history dividing unit 51 divides the viewing record every discretized time point discretized by unit time. The viewing time point discretizing unit 52 discretizes the viewing time points of the divided viewing records. The viewing history replicating unit 53 discretizes a viewing time period denoted by the respective divided viewing records by interval shorter than the unit time to acquire the discretized viewing time periods. The viewing behavior updating unit 56 updates the conditional probability table using the discretized viewing time periods of the respective divided viewing records as a viewing frequency. The viewing behavior updating unit 56 includes a viewing history counter 54 updating the conditional frequency table and a probability converter 55 updating the conditional frequency table.

The viewing behavior learning apparatus 92 may include an initialization unit 50 initializing the viewing history data or the conditional probability table.

A viewing behavior learning method using the viewing behavior learning apparatus 92 will be described below.

FIG. 4 is a flowchart illustrating a viewing behavior learning method according to the embodiment.

First, the initialization unit 50 builds a Bayesian network model for a viewing behavior (step S1) and initializes the conditional probability table and the conditional frequency table stored in the viewing behavior storage unit 16 (step S2). The processes of steps S1 and S2 are performed, for example, when the viewing behavior learning apparatus 92 is shipped or when the user requests for the initialization.

Next, it is determined whether a non-learned viewing record remains in the viewing history storage unit 14 (step S3). When a non-learned viewing record remains, the processes of steps S4 to S8 are performed. When a non-learned viewing record does not remain, the flow of processes is stopped until a non-learned viewing history data is notified. The processes of steps S4 to S8 may be performed every predetermined time periods, thereby processing the viewing history data stored in the viewing history storage unit 14 in a bundle.

When a non-learned viewing record remains, the viewing history dividing unit 51 divides the viewing record every discretized time points (step S4).

FIG. 5 shows an example of a viewing record over plural discretized time points. FIG. 6 shows an example of viewing records obtained by dividing the viewing record shown in FIG. 5 according to the embodiment.

When a viewing record over plural discretized time points as shown in FIG. 5 exists, the viewing history dividing unit 51 divides the viewing record into plural viewing records as shown in FIG. 6. In this example, the viewing record that the program is viewed from 20:58 to 22:10 is divided into three viewing records of 20:58 to 21:00, 21:00 to 22:00, and 22:00 to 22:10 every discretized time points. Only the In time and the Out time are divided and the other attributes are not changed.

FIG. 7 is an example of viewing history data obtained by dividing the viewing record every discretized time points according to the embodiment.

Next, the viewing time points of the divided viewing records are discretized (step S5). For example, in the viewing record in the first row of FIG. 7, the viewing time point is 21:00 to 21:15 and is discretized into 21-22. As shown in FIG. 7, the plural divided viewing records are similarly discretized. An attribute of a discretized time point is given to the discretized values. The discretization of the viewing time point is performed, for example, by the viewing time discretizing unit 52 of the viewing behavior learning unit 92. Since the viewing record is divided every discretized time points, it can be clearly determined what discretized time point the viewing records should take.

Then, the viewing history replication unit 53 discretizes the viewing time periods of the viewing records by a given interval to acquire the discretized viewing time periods (step S6). The interval is a time period shorter than the unit time of the discretized time point and is, for example, one minute. Here, the divided viewing records are discretized by the unit of minute, but may be discretized by the unit of second.

In step S6, the viewing history replication unit 53 replicates the viewing records so that the viewing records should be equal to the values of the viewing time periods. For example, in the viewing record in the first row of FIG. 7, since the program is viewed for 15 minutes from 21:00 to 21:15, the viewing record is replicated into 15 viewing records. In the viewing record in the second row, since the program is viewed for 60 minutes from 21:00 to 22:00, the viewing record is replicated into 60 viewing records. By replicating the other data similarly, 140 viewing records in total are obtained from the original 10 data. By replicating the viewing records in this way, the number of learning data increases, thereby enhancing the reliability of the conditional probability values calculated from the conditional frequency table.

Next, the viewing frequency counter 54 updates the conditional frequency table using all the replicated viewing records (step S7).

FIG. 8 shows an example of the conditional frequency table of node of channel according to the embodiment. FIG. 9 shows an example of the conditional frequency table of node of genre according to the embodiment. In FIGS. 8 and 9, only the frequencies in the time zone from 21:00 to 22:00 on Sunday are shown.

The conditional frequency table represents the frequencies of the values which child nodes can take when a parent node is a condition. For example, when the node of channel 32 has the conditional frequency table shown in FIG. 8, it means that the frequency for viewing CH1 from 21:00 to 22:00 on Sunday is 31, the frequency for viewing CH2 is 105, and the frequency for viewing CH3 is 4.

In step S7, the viewing frequency counter 54 updates the values that the child nodes can have by arranging the viewing records suitable for the condition of the parent node. Since the viewing record is replicated in step S6 so that the number of viewing records is equal to the number of discretized viewing time periods, the viewing frequencies discretized by the interval shorter than the unit time of the discretized time points is multiplied.

When the value of the discretized viewing time periods can be multiplied in step S7 to count the viewing frequencies, it is not necessary to substantially replicate the viewing record into a memory. For example, the number of replications shown in FIG. 7 may be held in the respective viewing record and then may be the viewing frequency corresponding to the number of replications in step S7.

Then, the probability converter 55 updates the conditional probability table using the conditional frequency table (step S8).

FIG. 10 shows an example of the conditional probability table of the node of channel according to the embodiment. FIG. 11 shows an example of the conditional probability table of the node of genre according to the embodiment. In FIGS. 10 and 11, only the probabilities in the time zone from 21:00 to 22:00 on Sunday are shown.

The conditional probability table shows the frequencies of the values that the child nodes can have when the parent node is the condition. For example, when the node of channel 32 has the conditional probability table shown in FIG. 10, it means that the probability for viewing CH1 from 21:00 to 22:00 on Sunday is 22%, the probability for viewing CH2 is 75%, and the probability for viewing CH3 is 3%.

In step S8, the probability converter 55 calculate the conditional probabilities of the child nodes by dividing the frequencies of the child nodes by the total sum of the frequencies of the child nodes suitable for the condition of the parent node, thereby updating the conditional probability table. For example, in the conditional frequency table shown in FIG. 9, since the total sum of the viewing frequencies from 21:00 to 22:00 on Sunday is 31+105+4=140, the probability of CH1 is 31/140=22%. By using this value as the viewing probability of CH1 from 21:00 to 22:00 on Sunday, the conditional probability table shown in FIG. 10 is updated.

When the viewing frequencies are counted without being finely divided, only 10 counts in total can be obtained, for example, from the viewing history data shown in FIG. 7, in which the frequency of CH1 in the time zone from 21:00 to 22:00 on Sunday is 5, the frequency of CH2 is 2, and the frequency of CH3 is 3. On the other hand, in the embodiment, since 140 counts in total are obtained from the same viewing history data, it is possible to obtain probability values with high reliability.

When the viewing frequencies are counted without being finely divided, the following probability values are obtained from the viewing history data shown in FIG. 7: the viewing probability of CH1 in the time zone from 21:00 to 22:00 on Sunday is 50%; the viewing probability of CH2 is 20%; and the viewing probability of CH3 is 30%. However, the total viewing time period of CH1 is 31 minutes, the total viewing time period of CH2 is 105 minutes, and the total viewing time period of CH3 is 4 minutes. Accordingly, when the viewing frequencies are counted without being finely divided, the viewing probability of the channel having the shorter viewing time period may be evaluated as being higher. Particularly, when the viewer performs the zapping operation of turning a channel for a short time, such a problem is remarkable. On the other hand, in the embodiment, since the viewing probability corresponding to the total viewing time period can be obtained, the inaccurate learning due to the zapping operation hardly occurs.

Accordingly, it is possible to acquire the viewing behavior with high reliability from the viewing history data acquired in a short time. That is, by using the viewing behavior learning apparatus 92 according to the embodiment, it is possible to learn a viewer's viewing behavior in a short time.

The above description is only an example of the invention. Accordingly, the invention is not limited to the above-mentioned embodiment, but may be modified in various forms. For example, since the viewing frequencies shown in the conditional frequency table also represent relative probabilities, the conditional frequency table in the above-mentioned embodiment may be treated as the conditional probability table.

It is to be understood that the present invention is not limited to the specific embodiments described above and that the present invention can be embodied with the components modified without departing from the spirit and scope of the present invention. The present invention can be embodied in various forms according to appropriate combinations of the components disclosed in the embodiments described above. For example, some components may be deleted from the configurations described as the embodiments. Further, the components described in different embodiments may be used appropriately in combination.

What is claimed is:

1. A viewing behavior learning apparatus for learning a viewing behavior of a viewer who views a program including at least one of video or audio, the viewing behavior learning apparatus comprising: a memory storing one or more instructions; and a processor configured to, upon executing the one or more instructions, perform:

acquiring a viewing record that indicates an attribute of the program and a viewing time point that indicates a start time and an end time during which the program was viewed;

dividing the viewing record into divided viewing records according to discretized time points discretized by a unit time, the divided viewing records respectively denoting a viewing time period during which the program was viewed;

discretizing the viewing time period for the respective divided viewing records by an interval shorter than the unit time to yield discretized viewing time periods, replicate the divided viewing records to yield a number of replicated viewing records equal to a number of the discretized viewing time periods, and determine respective viewing frequency values for the divided viewing records based on the replicated viewing records;

building a model of the viewing behavior by use of a Bayesian network having the viewing time point and the attribute of the program as random variables, and to store a conditional probability table of the Bayesian network; and updating a subset of records of the conditional probability table corresponding to the divided viewing records using the respective viewing frequency values.

2. The apparatus according to claim 1, wherein the unit time is one hour and the interval is one minute.

3. The viewing behavior learning apparatus according to claim 1, wherein the memory storing a conditional frequency table corresponding to the conditional probability table, and the updating instruction further comprises:
  updating the conditional frequency table by use of the viewing frequency values; and
  updating the conditional probability table using the conditional frequency table.

4. The apparatus according to claim 1, wherein the records of the conditional probability table correspond to respective discretized time points for respective days of the week.

5. A method for learning a viewing behavior for a program including at least one of video or audio, comprising:
  electronically acquiring, from a television, a viewing record indicating an attribute of the program and a viewing time point indicating a start time and an end time during which the program was viewed;
  dividing the viewing record into divided viewing records according to discretized time points discretized by a unit time, wherein the divided viewing records respectively denote a viewing time period during which the program was viewed;
  discretizing the viewing time period for the respective divided viewing records by an interval shorter than the unit time to yield discretized viewing time periods;
  replicating the divided viewing records to yield a number of replicated viewing records equal to a number of the discretized viewing time periods;
  determining respective viewing frequency values for the divided viewing records based on the replicated viewing records;
  building a model of the viewing behavior by use of a Bayesian network having the viewing time point and the attribute of the program as random variables;
  storing a conditional probability table of the Bayesian network; and
  updating a subset of records of the conditional probability table corresponding to the divided viewing records using the respective viewing frequency values.

6. The method of claim 5, further comprising setting the unit time to one hour, and setting the interval to one minute.

7. The method of claim 5, further comprising:
  storing a conditional frequency table corresponding to the conditional probability table;
  updating the conditional frequency table by use of the viewing frequency values; and
  updating the conditional probability table using the conditional frequency table.

8. The method of claim 5, wherein the storing the conditional probability table comprises storing the conditional probability table wherein the records correspond to respective discretized time points for respective days of a week.

9. A non-transitory computer-readable memory having stored thereon computer-executable instructions that, in response to execution, cause a computer system to perform operations, comprising:
  acquiring a viewing record indicating an attribute of a program and a viewing time point indicating a start time and an end time during which the program was viewed;
  dividing the viewing record into divided viewing records according to discretized time points discretized by a unit time, wherein the divided viewing records denote respective viewing time periods during which the program was viewed;
  discretizing the viewing time periods for the respective divided viewing records by an interval shorter than the unit time to yield discretized viewing time periods;
  replicating the divided viewing records to yield a number of replicated viewing records equal to a number of the discretized viewing time periods;
  determining respective viewing frequency values for the divided viewing records based on the replicated viewing records;
  building a model of the viewing behavior by use of a Bayesian network having the viewing time point and the attribute of the program as random variables; storing a conditional probability table of the Bayesian network; and
  updating a subset of records of the conditional probability table corresponding to the divided viewing records using the respective viewing frequency values.

10. The non-transitory computer-readable memory of claim 9, the operations further comprising setting the unit time to one hour, and setting the interval to one minute.

11. The non-transitory computer-readable memory of claim 9, the operations further including comprising:
  storing a conditional frequency table corresponding to the conditional probability table;
  updating the conditional frequency table by use of the viewing frequency values; and
  updating the conditional probability table using the conditional frequency table.

12. The non-transitory computer-readable memory of claim 9, wherein the storing the conditional probability table comprises storing the conditional probability table comprising the records, wherein the records correspond to respective discretized time points for respective days of a week.

* * * * *